(12) United States Patent
Yegneswaran et al.

(10) Patent No.: US 12,474,939 B2
(45) Date of Patent: Nov. 18, 2025

(54) SOUND AND CLEAR PROVENANCE TRACKING FOR MICROSERVICE DEPLOYMENTS

(71) Applicants: SRI International, Menlo Park, CA (US); Northwestern University, Evanston, IL (US)

(72) Inventors: Vinod Yegneswaran, Foster City, CA (US); Ashish Gehani, Atherton, CA (US); Hassaan Irshad, Union City, CA (US); Xutong Chen, Evanston, IL (US); Yan Chen, Northfield, IL (US)

(73) Assignee: SRI International, Menlo Park, CA (US)

( * ) Notice: Subject to any disclaimer, the term of this patent is extended or adjusted under 35 U.S.C. 154(b) by 922 days.

(21) Appl. No.: 17/505,018

(22) Filed: Oct. 19, 2021

(65) Prior Publication Data
US 2022/0121461 A1    Apr. 21, 2022

Related U.S. Application Data

(60) Provisional application No. 63/256,143, filed on Oct. 15, 2021, provisional application No. 63/094,159, filed on Oct. 20, 2020.

(51) Int. Cl.
G06F 9/455    (2018.01)
G06F 11/30    (2006.01)
G06F 11/34    (2006.01)

(52) U.S. Cl.
CPC ............ *G06F 9/455* (2013.01); *G06F 11/302* (2013.01); *G06F 11/3495* (2013.01)

(58) Field of Classification Search
CPC .... G06F 9/455; G06F 11/302; G06F 11/3495; G06F 2009/45562; G06F 2009/4557;
(Continued)

(56) References Cited

U.S. PATENT DOCUMENTS

2017/0318045 A1    11/2017   Johns et al.
2018/0046802 A1*   2/2018    Pyles ................. H04W 12/128
(Continued)

OTHER PUBLICATIONS

Hassan, et al., "Towards Scalable Cluster Auditing Through Grammatical Inference Over Provenance Graphs"; Network and Distributed Systems Security (NDSS) Symposium 2018, Feb. 18-21, 2018, San Diego, California, 15 pages.
(Continued)

*Primary Examiner* — Jorge A Chu Joy-Davila
(74) *Attorney, Agent, or Firm* — MOSER TABOADA

(57) ABSTRACT

Embodiments consistent with the present disclosure provide systems and methods for providing namespace-aware provenance tracking in a containerized environment. In some embodiments, methods for providing namespace-aware provenance tracking in a containerized environment may include monitoring, by one or more custom kernel hooks, event audit records from an OS kernel, wherein the one or more custom kernel hooks extend the functionality of the OS kernel; augmenting the event audit records from the OS kernel with one or more additional namespace aware audit records that include namespace information related to the container associated with event audit records, wherein the namespace information related to the container includes namespace IDs; processing, by an audit reporter, the namespace aware audit records to interpret the namespace IDs contained within the namespace aware audit records; and creating namespace-aware provenance graph that is namespace and container aware based on the namespace aware audit records.

20 Claims, 9 Drawing Sheets

(58) Field of Classification Search
CPC ....... G06F 2009/45591; G06F 9/45558; G06F 11/323; G06F 2201/815; G06F 11/3466; G06F 2201/865
See application file for complete search history.

(56) References Cited

U.S. PATENT DOCUMENTS

| 2019/0121979 | A1  | 4/2019  | Chari et al. |
| 2019/0394281 | A1* | 12/2019 | Awate ................. H04L 61/4552 |
| 2020/0059481 | A1  | 2/2020  | Sekar et al. |

OTHER PUBLICATIONS

Pasquier, et al., "Practical Whole-System Provenance Capture"; SoCC '17, Sep. 24-27, 2017, Santa Clara, CA; © 2017 Association for Computing Machinery, 14 pages.
International Search Report and Written Opinion mailed Aug. 4, 2021 for Application No. PCT/US21/30098, 11 pages.

* cited by examiner

Edges in the Open Provenance Model: source are effects, and destinations causes

SOUND AND CLEAR PROVENANCE TRACKING FOR MICROSERVICE DEPLOYMENTS

CROSS-REFERENCE

This application claims benefit of U.S. Provisional Patent Application No. 63/094,159 filed Oct. 20, 2020 and U.S. Provisional Patent Application No. 63/256,143 filed Oct. 15, 2021, both of which are hereby incorporated in their entireties.

GOVERNMENT RIGHTS

This invention was made with Government support under grant number 1514503 awarded by National Science Foundation and under contract number HSHQDC-16-C-00034 awarded by the U.S. Dept. of Homeland Security. The Government has certain rights in the invention.

FIELD

Embodiments of the present principles generally relate to container network applications and, and more particularly, to provenance tracking for microservice deployments of containerized applications.

BACKGROUND

Containers are utilized widely to decompose complex production Internet services into manageable (componentized) microservices. The use of containerization technologies for virtual application deployment, particularly for the scalable instantiation of production microservices, has grown at an astonishing rate.

Large-scale industrialized container applications are deployed as front-line services that handle various types of information that needs to be tracked. However, today's security solutions perform policy monitoring or enforcement from the perspective of application actions or network security policy control, with little insight into how and where sensitive information is stored within the container environment or transmitted across pipelines of cooperating containerized applications. Today's container security solutions are ineffective, or at best coarse-grained, in their ability to enforce even basic data security compliance requirements for sensitive data at rest (i.e., when stored in files). Data provenance is a record of the history of data traversing or being used by a system or network of systems. Such history information can be used to assure correctness and security of data, and also to help understand and protect the system's operations and information.

Previously, the ability to track provenance or taint tracking has been performed within the scope of the local host. However, in containerized environments, discrete applications are composed into a system or service. Further, these applications can be hosted across different container instances or even across different hardware assets. For example, current dataflow tracking systems have largely focused on tracking activity at a per-system level. However, they do not have the ability to effectively isolate activity happening within virtualized containers. While systems such as SYSDIG provide container-specific tags, they do not provide dataflow tracking capabilities.

Linux container-based microservices have emerged as an alternative to virtualization as they reduce application footprints and facilitate more efficient resource utilization. Their popularity has also led to increased scrutiny of the underlying security properties and attack surface of container technology. Provenance-based analysis techniques have been proposed as an effective means toward comprehensive and high-assurance security control as they provide fine-grained mechanisms to track data flows across the system and detect unwanted or unexpected changes to data objects. However, existing provenance tracking techniques are limited in their ability to build clear and collect provenance in container network environments due to complexities introduced by namespace containerization.

Specifically, existing provenance tracking solutions are inadequate for microservice scenarios. Namespace unawareness causes fragmentation and ambiguities (soundness). Meanwhile, container unawareness leads to missing essential container semantics (clarity). That is, the use of Linux namespaces introduces brittleness and ambiguities in data streams used by provenance tracking systems, such as those based on the Linux Audit subsystem, that lead to false or missing dependencies. Namespaces are a fundamental feature in the Linux kernel that facilitates efficient partitioning of kernel resources across process groups (cgroups). This is the key feature that is exploited by popular containerization technologies such as Docker. While processes within the same namespaces will share OS resources, those in different namespaces have isolated instances of corresponding operating system resources. For example, processes in the same mount namespace will have the same root directory. Conversely, two files in different mount namespaces can appear to have exactly the same path names within but can still be distinguished by the root directory of their respective mount namespaces—i.e., their path names are containerized (virtualized) by the mount namespace. Unfortunately, it is the containerized path names that will be recorded and reported by the kernel's auditing subsystems, making those two files indistinguishable, which leads to falsely conflated elements in inferred provenance graphs.

Furthermore, mishandling the effect of namespaces can make a provenance tracking system fail to correctly characterize essential aspects, such as the boundary of a container. Here the boundary of a container refers to the delineation of a provenance subgraph that represents the behavior within a container. It includes the processes running inside the container, the files manipulated by them, the sockets they create, etc. Without a proper understanding of container semantics, to identify the boundary of containers, it will be impossible for security analysts to reason about how, when, and what containers that are affected by attacks. These are referred to as clarity challenges for container provenance analysis.

Although discussed above in terms of Linux as an example, similar problems exist in other operating systems (OS) and OS kernels. For example Solaris Zone, BSD Jail, Android, Apple IOS, and the like.

Thus, there is a need for improved namespace-aware provenance tracking systems and methods to address the soundness and clarity challenges introduced by Operating System Namespaces in container runtime environments like Docker.

SUMMARY

Embodiments consistent with the present disclosure provide systems and methods for providing namespace-aware provenance tracking in a containerized environment. In some embodiments, methods for providing namespace-aware provenance tracking in a containerized environment may include monitoring, by one or more custom kernel hooks, event audit records from an OS kernel, wherein the one or more custom kernel hooks extend the functionality of the OS kernel; augmenting the event audit records from the OS kernel with one or more additional namespace aware audit records that include namespace information related to the container associated with event audit records, wherein the namespace information related to the container includes namespace IDs; processing, by an audit reporter, the namespace aware audit records to interpret the namespace IDs contained within the namespace aware audit records; and creating namespace-aware provenance graph that is namespace and container aware based on the namespace aware audit records.

Other and further embodiments in accordance with the present principles are described below.

BRIEF DESCRIPTION OF THE DRAWINGS

So that the manner in which the above recited features of the present principles can be understood in detail, a more particular description of the principles, briefly summarized above, may be had by reference to embodiments, some of which are illustrated in the appended drawings. It is to be noted, however, that the appended drawings illustrate only typical embodiments in accordance with the present principles and are therefore not to be considered limiting of its scope, for the principles may admit to other equally effective embodiments.

Figure 1:
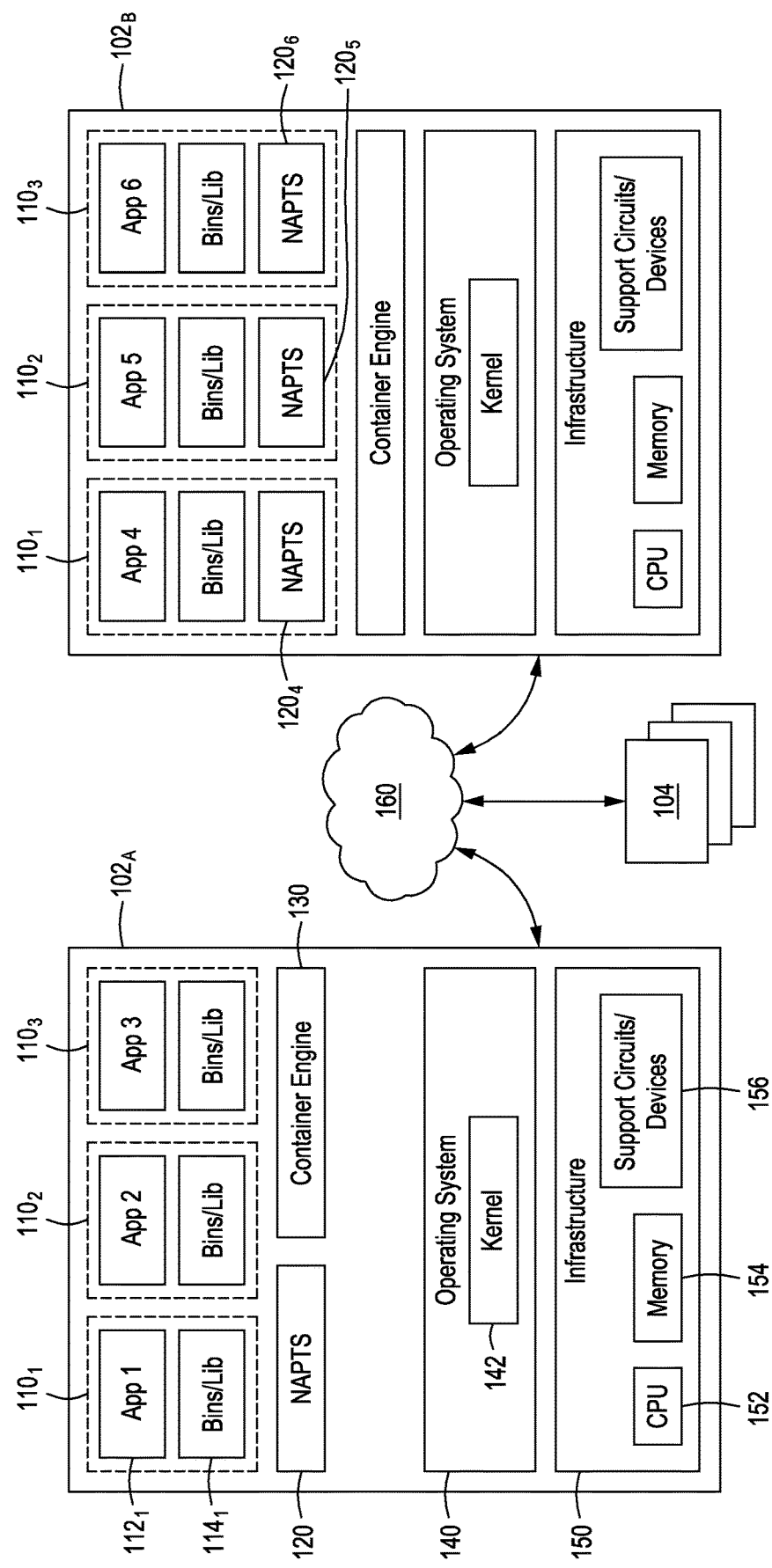
FIG. 1 depicts a high-level block diagram of a network architecture including a plurality containerized host computer systems implementing namespace-aware provenance tracking systems in accordance with an embodiment of the present principles.

To facilitate understanding, identical reference numerals have been used, where possible, to designate identical elements that are common to the figures. The figures are not drawn to scale and may be simplified for clarity. It is contemplated that elements and features of one embodiment may be beneficially incorporated in other embodiments without further recitation.

DETAILED DESCRIPTION

Embodiments of the present principles generally relate to namespace-aware provenance tracking methods, apparatuses and systems to produce namespace-aware and container-aware audit records and provenance graphs that advantageously address the soundness and clarity challenges introduced by, for example, Linux Namespaces or the like in container runtime environments (e.g., Docker or other container development/runtime platforms). Embodiments consistent with the present description provide clear and unambiguous provenance graphs which are important for providing strong security guarantees. Furthermore, embodiments of the namespace-aware provenance tracking methods, apparatuses and systems described herein are built around dataflow tracking systems such as SPADE (Support for Provenance Auditing in Distributed Environments) and Linux Audit.

SPADE is an open source software infrastructure for data provenance collection and management. Embodiments of the namespace-aware provenance tracking methods, apparatuses and systems described herein provide a set of extensions to SPADE that enable it to accurately track provenance across Namespaces has been developed. Specifically, provenance challenges introduced by four of the key namespace (PIC, mount, Network and IPC) in the context of Linux Audit are addressed.

Here, a namespace-aware provenance tracking system (NAPTS) is described that addresses the unique soundness and clarity challenges introduced by traditional provenance tracking solutions. For soundness, an analysis of how the virtualization provided by each relevant namespace causes fragmentation and ambiguity in the inferred provenance is provided. For each relevant namespace, a corresponding technical solution is provided to resolve both issues. To improve clarity, essential container-specific semantics including boundary of containers and initialization of containers is defined. Next, summarization techniques are proposed for each semantics to automatically mark the corresponding provenance subgraphs.

The performance of the inventive NAPTS provided herein was evaluated against a spectrum of container-specific attacks. The results demonstrate the utility of the disclosed system and how it outperforms existing provenance tracking systems by providing an accurate and concise view of data provenance in container environments. Specifically, these results show the NAPTS works across various container engines and outperforms the traditional provenance tracking technique by producing superior provenance graphs with an acceptable increase in system overhead (<5%).

The aforementioned embodiments and features are now described below in detail with respect to the Figures.

FIG. 1 depicts a high-level block diagram of a network architecture 100 including a plurality containerized host computer systems 102A, 102E implementing namespace-aware provenance tracking systems (NAPTS) and other computer systems/device 104 communicatively coupled over one more networks 160. Each of the containerized host computer systems 102A, 102E includes a plurality of containers $110_{1-x}$ and may communicate with each other, and/or with other systems/devices 104, over network 160. Each of the virtual containers created on the host computer systems 102A, 102E includes one or more containerized applications 112 and Bins/Libs 114 associated with the one or more containerized application 112. The Bins/Libs 114 include the binaries and system libraries and settings needed to run the applications 112. In some embodiments, the plurality of networked containerized host computer systems 102A, 102E implementing namespace-aware provenance tracking systems shown in FIG. 1 may be deployed and implemented on an enterprise network to provide enterprise taint tracking.

The container engine 130 includes the containerization technology to communicate with the operating system 140/kernel 142 to build and containerize the applications 112 and create containers 110. There are several existing commercial container engines that may be used with embodiments of the present disclosure including DOCKER, CRI-O, RAILCAR, RKT, LXC, MESOS, etc. In some embodiments, custom container engines may be built and/or used.

The operating system (OS) 140 and its kernel 142 generally manages various computer resources and host computer system infrastructure 150. Examples of the operating system 140 may include, but are not limited to, various versions of LINUX and the like. In some embodiments, the kernel 142 is domain agnostic. The host computer system infrastructure 150 may include one or more CPUs 152, memory/storage devices 154, and support circuits/devices 156. The CPU 152 may include one or more commercially available microprocessors or microcontrollers that facilitate data processing and storage. The various support circuits 156 facilitate the operation of the CPU 152 and include one or more clock circuits, power supplies, cache, input/output circuits, and the like. The memory 154 includes at least one of Read Only Memory (ROM), Random Access Memory (RAM), disk drive storage, optical storage, removable storage and/or the like.

Each of the containerized host computer systems 102A, 102E includes one or more namespace-aware provenance tracking system (NAPTS) 120 configured to produce namespace-aware and container-aware audit records and provenance graphs. In at least some embodiments consistent with the disclosed models herein, each container 110 can be managed by an independent NAPTS 120, which follows a container-specific namespace-aware provenance tracking architecture. In some embodiments, as shown in containerized host computer systems 102A, a single NAPTS 120 is implemented and handles all namespace-aware provenance tracking audit records and provenance graphs across all containers $110_{1-3}$ and containerized applications $112_{1-3}$. In other embodiments, containerized host computer systems 102B, separate instances of the NAPTS $120_{4-6}$ are associated with each container $110_{4-6}$ and containerized applications $112_{4-6}$.

Figure 2:
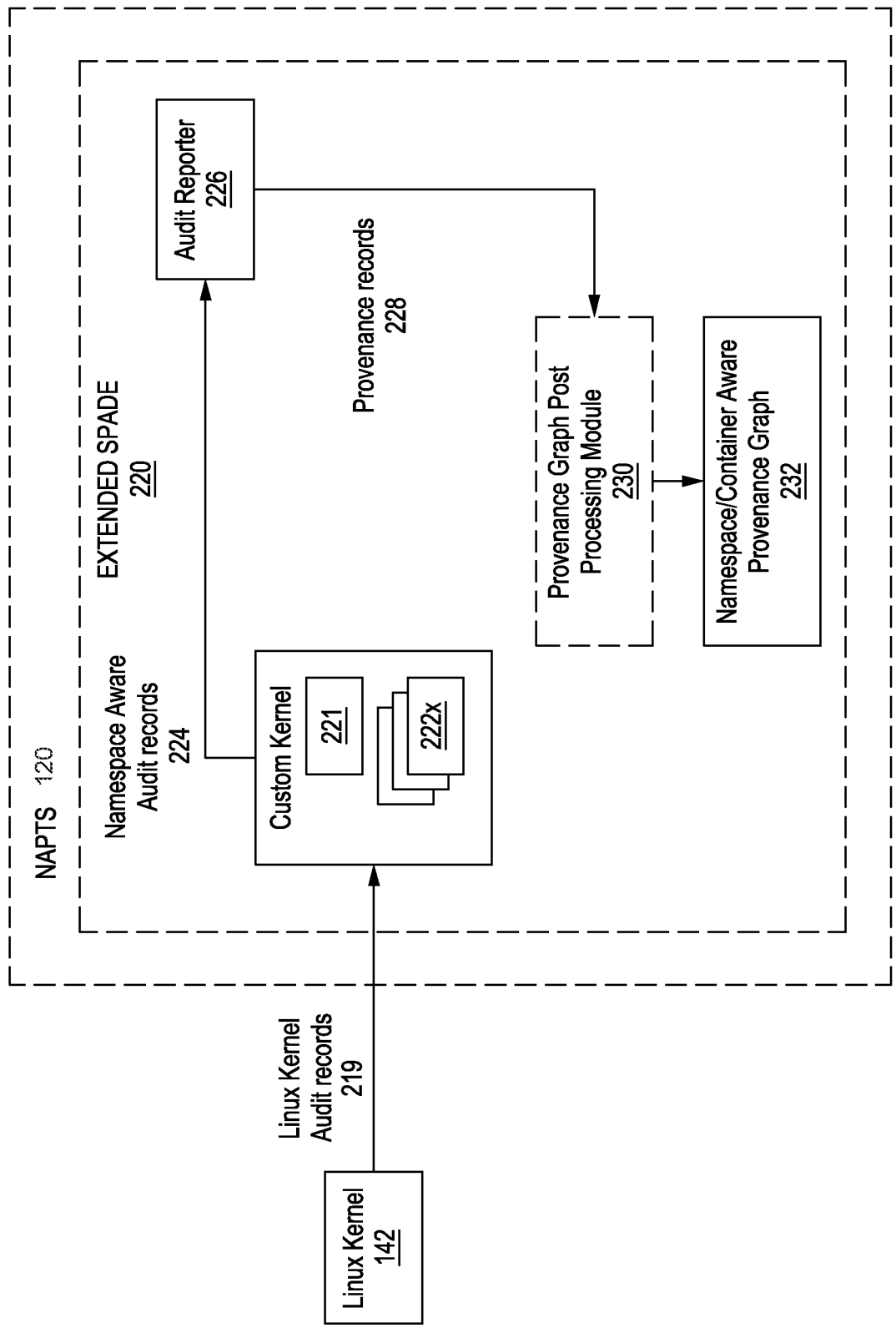
FIG. 2 depicts a high-level block diagram including further details of a namespace-aware provenance tracking systems in accordance with an embodiment of the present principles.

FIG. 2 is a block diagram that depicts further details of the namespace-aware provenance tracking system (NAPTS). The NAPTS 120 is first described more generally with respect to FIG. 2, and then in more details with examples of event audit records and provenance graphs with respect to FIGS. 4-7. The NAPTS 120 performs application level process monitoring in a containerized environment by monitoring event/audit records 219 produced by the kernel 142. Since containers are a user space notion, and not a kernel space notion, the kernel 142 does not provide container or namespace information. That is, the audit records that come out of the kernel 142, for example such as from a standard LINUX kernel, normal audit event stream has no mention of namespaces or containers because containers are not a kernel construct, but rather a user space construct. Thus, the NAPTS 120 extends and improves the SPADE provenance tracking system 220 with additional container-specific extensions. More specifically, introduces a custom kernel 221 that extends the functionality of the kernel 142 by augmenting the event stream audit records 219 with extra records that include namespace/container information and create namespace aware audit records 224. In some embodiments, the custom kernel 221 may launch be one or more custom kernel hooks 222 to perform the monitoring of various event audit stream records from the kernel 142 and other tasks as described herein. In some embodiments, the one or more custom kernel hooks 222 can by Linux kernel modules/hooks, extended Berkeley Packet Filter programs/hooks, or other similar type of kernel hooks that enable kernel enhancements, which are otherwise self-contained, to become loadable kernel modules and retain a substantial degree of independence from the kernel source.

Thus, the Linux kernel, for example, can be extended by launching one or more custom kernel hooks 222 which can be dynamically loaded and removed. In some embodiments, if specific required namespace related information wasn't captured in the Linux kernel's audit records that are generated by default, the one or more custom kernel hooks 222 launched would monitor namespace-related system calls, as well as a few others, to create addition user-defined records that include the required namespace and container information (i.e., the custom kernel hooks 222 generates extra records).

In some embodiments, the custom kernel 221 and/or the one or more custom kernel hooks 222 adds and makes use of Netfilter hooks to extract network information as well. Netfilter is a framework provided by the Linux kernel that allows various networking-related operations to be implemented in the form of customized handlers. Netfilter represents a set of hooks inside the Linux kernel, allowing specific kernel modules to register callback functions with the kernel's networking stack. Typically, the audit records 219 that are generated by the Linux kernel when networking system calls occur, only report the remote endpoint. The local endpoint is not reported. That's not enough to completely understand a network flow. To understand network flow completely, both the local and remote endpoints are needed. Therefore the custom kernel 221 uses Netfilter hooks to obtain the necessary network information. The Netfilter-based solution for tracking the host-container IP/port mapping and use the network namespace ID as a distinguisher is discussed below in more detail. In some embodiments, the custom kernel 221 uses eBPF hooks to obtain the necessary network information/

Figure 3:
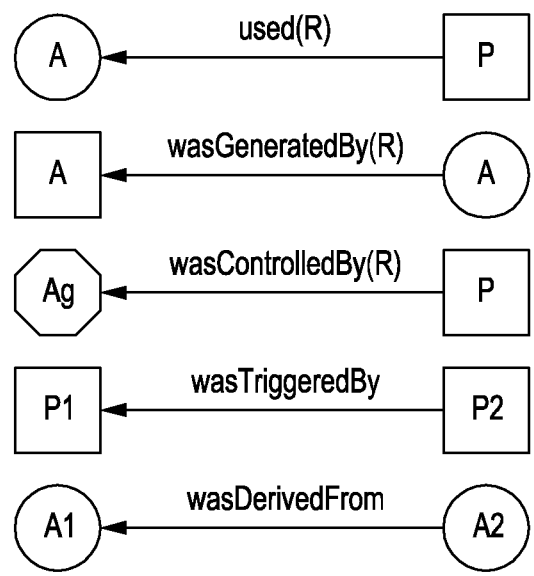
FIG. 3 depicts information associated with the Open Provenance Model in accordance with the present principles.

In operation, the custom kernel 221 and/or the one or more custom kernel hooks 222 of the NAPTS 120 monitors for event audit records 219 from the kernel 142. As discussed above, the custom kernel 221 extends the event audit records 219 to include additional information and provide namespace aware audit records 224. The namespace aware audit records 224 are processed by the Audit Reporter 226. The Audit Reporter 226 included in the NAPTS 120 is an improved/modified version of an audit report of the opensource versions of SPADE. Specifically, the Audit Reporter 226 included in the NAPTS 120 receives the namespace aware audit records 224, and is able to interpret the namespace IDs and container labels/information included in them, as opposed to previous, or opensource versions of SPADE audit reporters and the like which do not have that functionality. Specifically, the audit reporter 226 processes the namespace aware audit records 224 and creates a provenance graph of vertices and edges in an Open Provenance Model (OPM) record format. The Provenance record 228 (also referred to herein as a provenance graph 228) is an accepted standard model record of provenance that is designed to meet the following requirements: (1) Allow provenance information to be exchanged between systems, by use of a compatibility layer based on a shared provenance model. (2) Allow developers to build and share tools that operate on such a provenance model. (3) Define provenance in a precise, technology-agnostic manner. (4) Support a digital representation of provenance for things, whether produced by computer systems or not. (5) Allow multiple levels of description to coexist. (6) Define a core set of rules that identify the valid inferences that can be made on provenance representation. The Provenance record 228 aims to capture the causal dependencies between the artifacts, processes, and agents. Therefore, a provenance graph is defined as a directed graph, whose nodes are artifacts, processes and agents, and whose edges belong to one of the following categories depicted in FIG. 3. A provenance graph is a directed graph $G=(V_G, E_G)$, with vertex set $V_G$ and edge set $E_G$. Vertices in $V_G$ represent the provenance graph elements (i.e. entities, activities, and agents). There is an edge $e=(v_i,v_j) \in E_G$ if there is a provenance relation in the graph relating vertex $v_i$ to $v_j$, $v_i,v_j \in V_G$, in that direction. That is, an edge represents a causal dependency, between its source, denoting the effect, and its destination, denoting the cause. Thus, the one or more custom kernel hooks 222x provides records to the audit reporter 226 which produces one or more provenance records 228 that are part of a provenance graph, as described above. In some embodiments, the provenance graph is a property graph that includes annotations on the vertices and edges which have key-value pairs associated with them. It is those annotations where all the domain semantics of interest get captured.

In some embodiments, the audit reporter 226 sends the one or more provenance records 228 which include namespace and container aware information, to a Provenance Graph Post Processing Module 230 to undergo further postprocessing before being finalized. In other embodiments, the one or more provenance records 228 produced by the audit reporter 226 is the final the namespace aware provenance graph 232 produced by the NAPTS 120.

In some embodiments, the postprocessing of the namespace aware provenance graph 232 by the Provenance Graph Post Processing Module 230 involves analyzing the namespace aware provenance graph to identify a boundary of all items in one container (i.e., grouping them). In some embodiments, the Provenance Graph Post Processing Module 230, may identify the subgraph that is related to the initialization of the container.

The NAPTS 120 is now described in further details with background information, examples of event audit records, and namespace aware provenance graphs with respect to FIGS. 4-7.

Linux namespaces provide a foundational mechanism leveraged by containerization technologies to enable system-level virtualization. They are advertised as a Linux kernel feature that supports isolating instances of critical operating system resources including process identifiers, filesystem, and network stack across groups of processes. Internally, namespaces are implemented as an attribute of each process, such that only those processes with the same namespaces attribute value can access corresponding instances of containerized system resources. Currently, eight namespaces are supported by the Linux kernel as listed in Table 1.

TABLE 1

Supported Linux Namespaces

| Namespace | Isolated System Resource |
| --- | --- |
| Cgroup | Cgroup root directory |
| IPC | System V IPC, POSIX message |
| Network | Network devices, stacks, ports, etc. |
| Mount | Mount points |
| PID | Process IDs |
| Time | Boot and monotonic clocks |
| User | User and group IDs |
| UTS | Hostname and NIS domain name |

Consider the mount namespace as an example. On a Linux operating system that has just been booted, every process runs in an initial mount namespace, accesses the same set of mount points, and has the same view of the filesystem. Once a new mount namespace is created, the processes inside the new mount namespace can mount and alter the filesystems on its mount points without affecting the filesystem in other mount namespaces.

Linux containers may be viewed as a set of running processes that collectively share common namespaces and system setup. In practice, containers are usually created by a container engine using its container runtime. The container runtime will specify the namespace to be shared among processes running inside the container. As a concrete example, the Docker container engine specifies five namespaces (PID, Mount, Network, IPC and UTS) to be shared, initializes several system components including rootfs/, hostname, /proc pseudo-filesystem, and finally executes the target application as the first process inside the container.

Before providing details of the NAPTS 120 and namespace/container aware provenance graphs produced by the NAPTS 120, the performance of three classes of state-of-the-art provenance tracking solutions and the issues faces is first shown against a credential theft insider attack. Notably, during this attack, the attacker touches the/etc/passwd file in both a container and the host system.

Figure 4A:
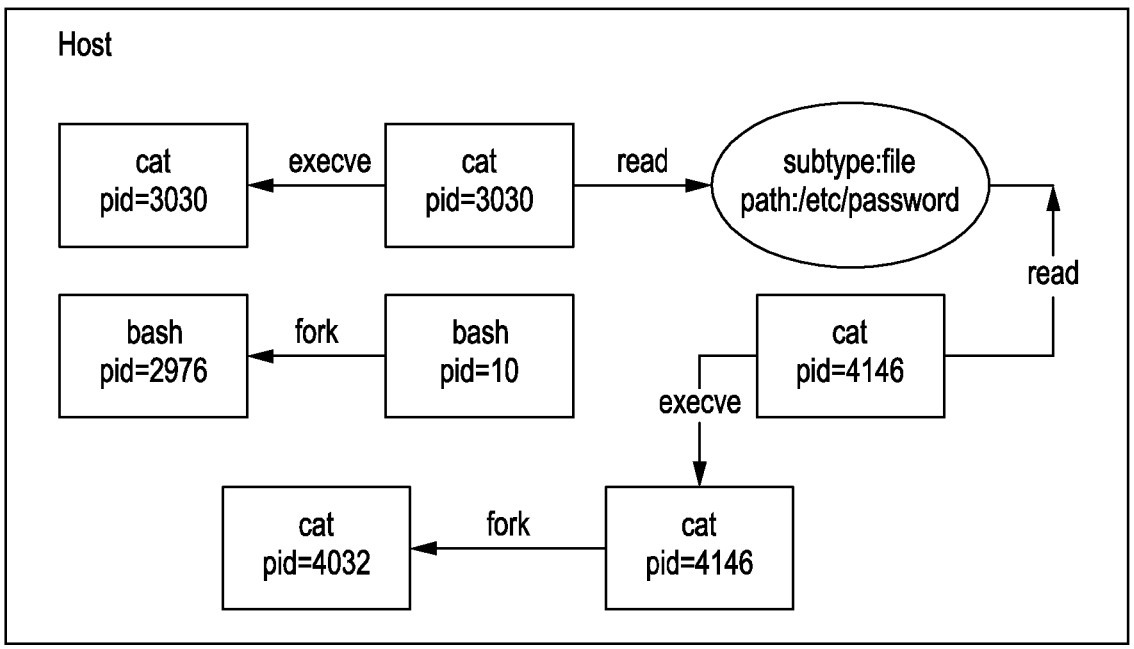
FIGS. 4A-4C depict examples of provenance tracking without namespace or container awareness.
Figure 4B:
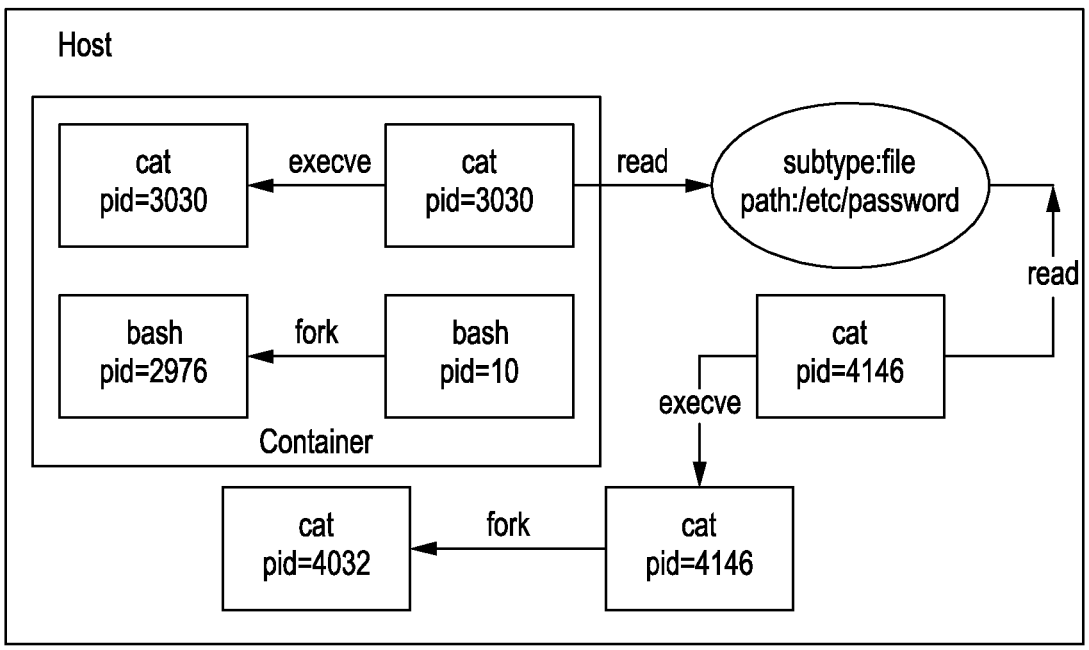

First, as shown in FIG. 4A, traditional provenance solutions that lack both container and namespace awareness, e.g., SPADE, are unable to deliver a sound and clear illustration of this attack step. To illustrate soundness challenges, it is explained how fragmentation and ambiguity occur in the figure. For fragmentation, when bash (2976) forks a child process bash (10) with the global PID 3030 to execute the cat command, the virtualized PID 10 will be reported and used in building this process creation provenance so bash (3030) splits into two vertices, bash (10) and cat (3030), which build incorrect fork and execve edges correspondingly. For ambiguity, consider the file/etc/passwd. Since the file path is virtualized, ambiguity occurs on the vertex representing two/etc/passwd files (inside and outside the container respectively) simultaneously. The correct graph should contain two separate/etc/passwd file artifact vertices.

Second, solutions that only provide container awareness, e.g., Winnower, also suffer from the soundness challenge. Though they can distinguish the processes inside the container in FIG. 4B, the ambiguity and graph fragmentation issues persist. This is also the case for other simple container labeling solutions, e.g., using a cgroup prefix or a SELinux label for every provenance artifact.

Figure 4C:
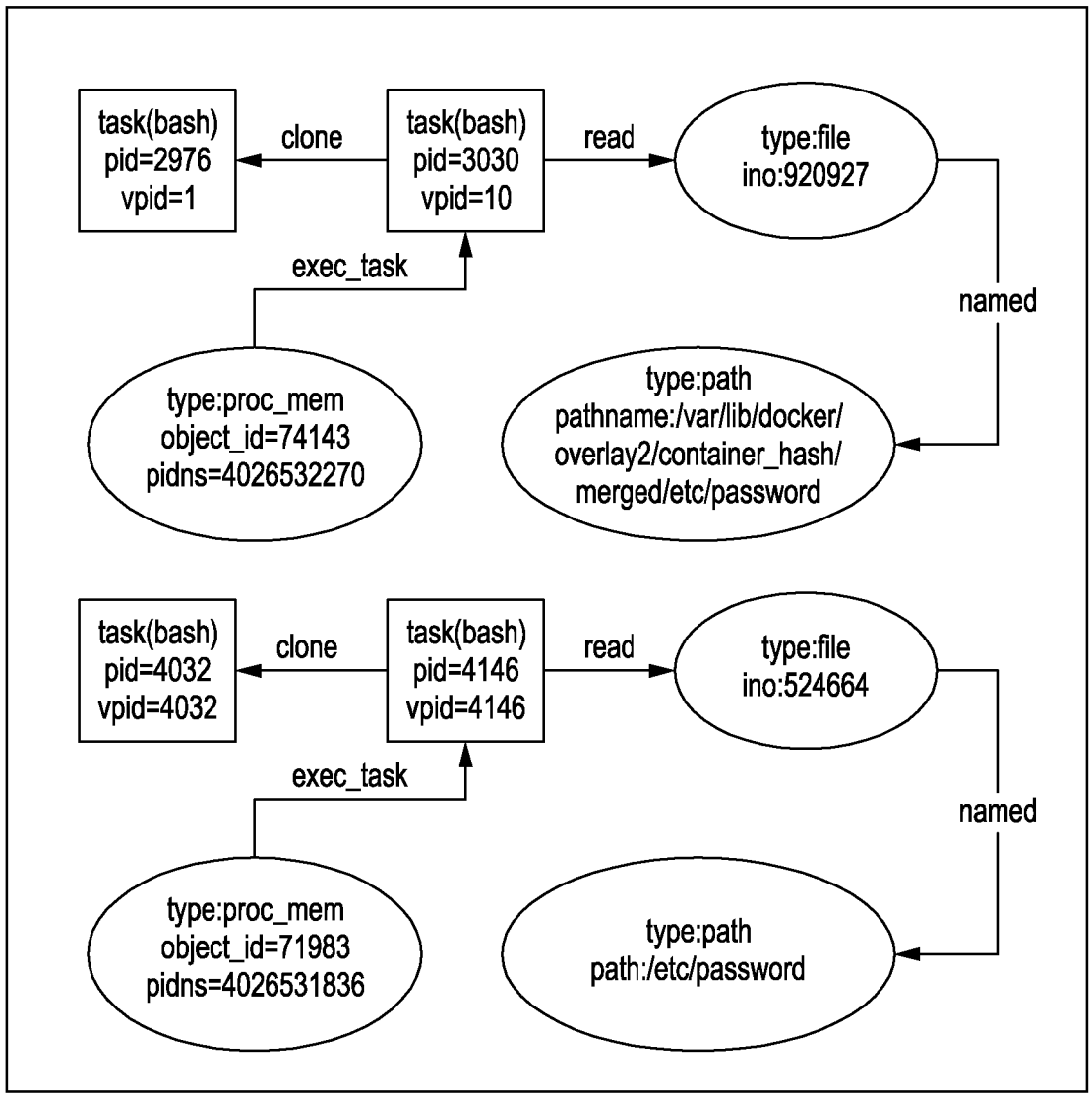

Third, solutions that only provide namespace awareness, e.g., CamFlow, still suffer from the clarity challenge. As shown in FIG. 4C, they do not capture essential container semantics, such as the boundary of containers, complicating security analysis. As CamFlow provides a more fine-grained and complex provenance graph, non-trivial additional graph analysis will be required to design and apply similar semantic patterns in CamFlow to provide clarity. For instance, to support the boundary of containers, it is necessary in CamFlow to (1) put the PID namespace identifier on every task vertex to group processes inside a container by aggregating PID namespace information; (2) get the namespace-virtualized pathname and the mount namespace identifier for each file to reveal whether the file is inside a container by complementing mount namespace information.

For (1), the process memory vertex assigned to each task vertex needs to be found and its PID namespace identifier used. FIG. 4C illustrates a simple case. In practice, the graph analysis required is more complex. Because CamFlow uses versions to avoid cycles or to record any object state change for a provenance artifact, a path traversal is needed to find the correct version of the task vertex, i.e., where a clone tries to assign the process memory. For (2), CamFlow does not provide virtualized paths and mount namespace identifier for file vertices natively.

System Design and Implementation

In this section, a further detailed description of the NAPTS 120 design is provided and the implementation that extends the SPADE provenance tracking system with additional container-specific extensions. Our design goal is to propose a solution for addressing soundness and clarity challenges by only using trusted information from the kernel while limiting extra instrumentation.

The NAPTS 120 is configured to handle all aliasing introduced by namespaces. First, all system calls that can be used to manipulate namespaces generally are covered, i.e., clone, unshare and setns. Their semantics are investigated and associated provenance data models with consideration to different argument combinations are provided. Second, all existing namespaces are analyzed and the information that will be aliased in the low-level audit and cause problems to provenance tracking is understood.

The virtualized namespace-mapping strategies are summarized in Table 2. For the soundness challenge, a host-container mapping view on provenance graph artifacts that are impacted by most Linux namespaces are established because this provides at clear view for users to understand the provenance. However, for the IPC namespace, the host view of an IPC object does not actually exist. Hence, the NAPTS 120 adopts a namespace-labeling approach.

map cloned child processes to its parent; (iii) using/proc/PID/status for mapping information; and (iv) using kernel module injection to get the PID mapping from kernel data structures. Embodiments consistent with the NAPTS 120 implement the kernel module (i.e., item (iv) above) for several reasons. It was found that directly using PPID was infeasible because it sometimes points to the parent of the process creating it. For the timestamp option, the granularity provided by audit record cannot guarantee that the order of process creation matches the order corresponding system call events. It was also decided against using/proc/PID/status information as the/proc filesystem does not support asynchronous callbacks and the overhead of polling is prohibitive.

The NAPTS 120 implements the PID namespace host-container mapping solution as a kernel module that intercepts process-manipulation-related system calls, e.g., clone, fork, and vfork. Once those system calls are invoked by a process, the NAPTS 120 does not directly use the return value to determine the PID of its child process because it can be virtualized. Instead, the NAPTS 120 inputs this return value to a kernel helper function pid nr( ) in/include/linux/pid.h to generate the global PID. Ultimately, the NAPTS 120 uses the global PID to generate the sound provenance graph. However, the NAPTS 120 still capture both the global PID and virtualized PID for every process vertex such that a complete view can be provided.

Mount Namespace

To obtain the host-container mapping for file paths virtualized by containers, the NAPTS 120 leverages an empirically derived design principle about the mount namespace, that is consistent across state-of-the-art container engines, to develop an instrumentation-free solution.

This empirical design principle is that the newly created mount namespace needs the init process, i.e., the process with virtual PID 1, to provide a new filesystem view different from that in the parent mount namespace. It is achieved by using root directory change system calls, i.e., pivot_root and chroot, where new root directories are provided in their arguments. Specifically, state-of-the-art container engines make the init process move CWD to the root directory of a new container by using chdir (container root_path) and then invoke a pivot_root ('.','.') or a chroot ('.') to wrap up the root directory change.

Therefore, if the NAPTS 120 monitors those root directory change system calls, it can use the CWD record associated with the chdir to find the host path of the container root directory, and then the NAPTS 120 attaches this host path to every virtualized path as a prefix to establish the host-container mapping on file paths. Given the annotation in Table 3, the algorithm is described as four steps.

TABLE 2

Supported Linux Namespaces

| Namespace | Affected Provenance Data | Strategy |
| --- | --- | --- |
| PID | Process IDs | Host-container mapping |
| Mount | File paths | Host-container mapping |
| Network | Local IP addresses and ports | Host-container mapping |
| IPC | IPC Object IDs and names | Namespace labeling |

PID Namespace

Multiple options to tackle the PID host-container mapping problem were considered including: (i) directly using PPID (parent PID) to connect processes; (ii) using timestamps to

TABLE 3

Operator Annotation

| Annotation | Explanation |
| --- | --- |
| put((key, value), X) | put a pair (key, value) in a mapping X |
| get(key, X) | get the value from a mapping Y given the key |

Step 1. Handle chdir. (input: PID 'p1', CWD 'cwd1'; operation: put ((p1,cwd1), LastCWD)). The NAPTS 120 does this to record the last working directory for every process. With this information, the NAPTS 120 can know what the last CWD of the first process inside a new container is, which will be the prefix for every virtualized path.

Step 2. Handle pivot_root or chroot. (input: PID 'p1'; operation: put ((p1, get (p1, LastCWD)), Prefix)). When a root directory changing system call occurs, the NAPTS 120 labels the corresponding process with the last CWD as the prefix.

Step 3. Handle virtualized PATH records, CWD records and arguments related to file operation system calls with path prefix. (input: PID 'p1', syscall 's1', operation: if 's1' is 'open', 'read', 'write' etc. Use get (p1, Prefix) to add a new annotation 'nsroot' representing the host prefix in the corresponding artifacts). This helps propagate the prefix from processes to file artifacts.

Step 4. Handle (clone, fork, vfork). (input: Parent PID 'p1', Child PID 'p2'; operation: put ((p2, get (p1, Prefix)), Prefix)). The prefix (root directory) information will be propagated through process creation as kernel does.

This inventive mount namespace mapping solution is considered robust because it relies on a standardized implementation technique for filesystem isolation and empirically validate its adoption across representative container engines including Docker, rkt and LXC.

For other cases where directories are shared between host and container than chroot-like cases, the NAPTS 120 solution still works well. Taking bind mount as an example, the key components in the bind mount provenance graph will be one process vertex which executes a mount system call along with two file artifacts representing the bound directories and two file artifacts are connected by an edge representing that mount system call. In this case, only the file path of the file artifact inside the container will be affected and our solution can still provide the host view of this file.

Network Namespace

For accurate provenance tracking of container network activity, embodiments consistent with the NAPTS 120 need to establish the host-container mapping for virtualized local IP addresses and ports. To this end, a Netfilter-based solution is used for tracking the host-container IP/port mapping and use the network namespace ID as a distinguisher. Netfilter is a Linux-kernel framework that provides hooks to monitor every ingress and egress packet, including packets from or to containers, on the host network stack. The host network stack will do a source NAT for container egress packets and a destination NAT for container ingress packets before correctly forwarding those packets. Therefore, by monitoring the IP/port NAT about container ingress/egress packets on the host network stack, the NAPTS 120 can build the host-container mapping of local IP addresses and ports for sockets inside containers. The NAPTS 120 annotates each network socket artifact with the corresponding network namespace identifier, so sockets from different containers can be reliably distinguished.

In some embodiments consistent with the NAPTS 120, the implementation for the network namespace consists of two parts: (1) network namespace identification; and (2) Netfilter-based address mapping. For network namespace identification, the custom kernel hooks 222 in the modified/extended SPADE system 220 is configured to intercept network-related system calls and put the network namespace identifier of the calling process on the generated network provenance record. For NAT mapping, Netfilter hooks in the custom kernel module 221 are added at the beginning and ending of packet processing chains. Specifically, PRE_ROUTING and LOCAL_INPUT are used for destination NAT, while POST_ROUTING and LOCAL_OUTPUT are used for source NAT. The former two hooks provide the mapping for ingress connections from the container and the latter two provide the mapping for egress connections.

Whenever a new mapping is added, the NAPTS 120 will search for the network device having the virtualized local IP address in the new mapping, by iterating through network namespaces using the function ip_dev_find (struct net *net, _be32 addr). Through this, the container related to this virtualized local IP address is found and the mapped global local IP address/port is put on the socket artifact that has the virtualized local IP address/port in the new mapping. As a special case, a socket may listen on 0.0.0.0 (IN_ADDR_ANY), i.e., it can accept connection on any local IP address. Hence, when the NAPTS 120 matches socket artifacts with the virtualized local IP address/port in the container, the NAPTS 120 treats 0.0.0.0 as a matched local IP and only checks the local port.

IPC Namespace

The issue in the IPC namespace is that two different IPC objects from different IPC namespaces may have the same ID/name. Unlike other namespaces, the host-container mapping strategy for disambiguation does not extend to IPC object artifacts, because there is no corresponding host IPC object for virtualized IPC objects. Our design involves adding an IPC namespace ID to every IPC object artifact so that IPC objects from different containers can be uniquely distinguished.

The implementation of the IPC namespace solution was affected by adding IPC namespace IDs to IPC objects affected by namespace virtualization. Those objects consist of the POSIX message queue and all System V IPC objects, i.e., message queue, semaphore, and shared memory. The NAPTS 120 assigns and propagate IPC namespace ids by carefully interpreting process management system calls, e.g., clone, and IPC object management system calls, e.g., msgget and msgsnd.

In embodiments consistent with the NAPTS 120, to address the clarity challenge, two container semantics which can significantly improve the quality of provenance graph are implemented: (1) Boundary of Containers, and (2) Initialization of Containers.

Although discussed above in terms of Linux as an example, similar problems exist in other operating systems (OS) and OS kernels as shown in Table 4 below. Embodiments consistent with the present disclosure solve the soundness, clarity, brittleness, and fragmentation issues for OSs such as Linux, Solaris Zone, BSD Jail, Android, Apple IOS, and the like.

TABLE 4

Provenance Soundness in BSD Jails and Solaris Zones

| Resource | BSD Jail | Solaris Zone |
|---|---|---|
| Process | BSD Jails use JID (Jail ID) to mark the processes inside a jail. Thus no virtualized PID is used and no soundness challenge will be introduced. | Zone ID is used to isolate the processes. Thus no virtualized PID is used and no soundness challenge will be introduced |

TABLE 4-continued

Provenance Soundness in BSD Jails and Solaris Zones

| Resource | BSD Jail | Solaris Zone |
| --- | --- | --- |
| Filesystem | Ambiguity exists because filesystem isolation is also achieved by chroot-like operation and file path will be virtualized while the root directory path is specified by jail system call | Ambiguity exists because a Zone needs a new root directory to be specified. |
| Network | This depends on what network isolation method is applied. If bindfiltering is applied, sockets are actually created under host network stack so that no soundness challenge would occur. Otherwise, if epair of VNET is used for network isolation, each jail would have a completely separate network stack just like what happens in Linux network namespace. Then both fragmentation and ambiguity can exist. | Both fragmentation and ambiguity can exist. When the default exclusive-IP setting is applied, Data-link acts just like veth pairs in Ubuntu and epair in BSD to provide the isolated network stack where sockets are virtualized. |
| IPC | Ambiguity exists. POSIX IPC objects are naturally isolated and System V IPC objects can be isolated with specific parameters so two IPC objects can have the same ID/name. | Ambiguity exists. System V IPC objects are naturally isolated and two System V IPC objects can have the same ID/name. |
| User | The same provenance effect as that described with Linux Namespaces | The same provenance effect as that described with Linux Namespaces |
| Time, UTS and Cgroup | These do not affect dataflow in practice and thus do not directly impact provenance | These do not affect dataflow in practice and thus do not directly impact provenance. |

Boundary of Containers

First, a practical definition for a container at runtime is provided. A container at runtime is a set of processes that share the same PID namespace. Usually processes inside a container can share multiple namespaces but, most critically, they at least have to share the PID namespace. In fact, while container runtimes often provide support for sharing other namespaces, e.g., mount, IPC, and network, between containers, none of them allow for sharing the PID namespace.

Next, the relationship between an artifact, e.g., file and network, and a container is defined. An artifact relates to a container if it can be accessed by a process in side that container. Here, "accessed" may refer to any type of read-write operation. An artifact may relate to several containers and thus may be used to infer the relationship between specific containers. An important challenge is labeling each process with the correct namespace identifier. This is addressed by carefully designing a new provenance data model for system calls related to namespace operations. There are three system calls for tracking the boundary of containers, i.e., clone, unshare and setns. Clone and unshare system calls are used for creating new namespaces; thus, they signal the process of creating a container boundary. Setns is used for aggregating two namespace together or making another process join a namespace.

Figure 5:
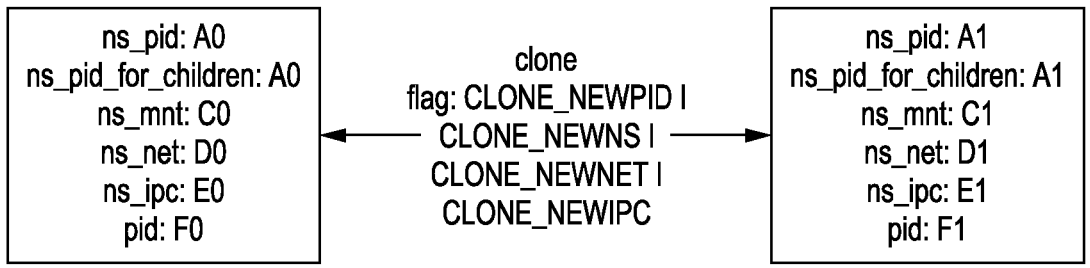
FIG. 5 depicts an Open Providence Model format showing handling of the clone system call, in accordance with an embodiment of the present principles.
Figure 6:
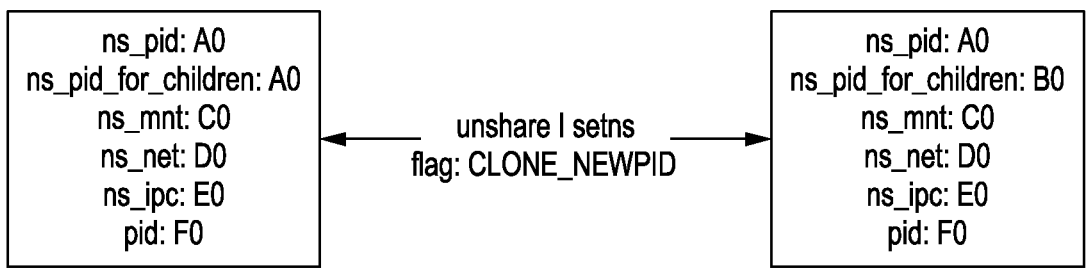
FIG. 6 depicts an Open Providence Model format showing handling of the unshare and setns system calls on NEWPID, in accordance with an embodiment of the present principles.
Figure 7:
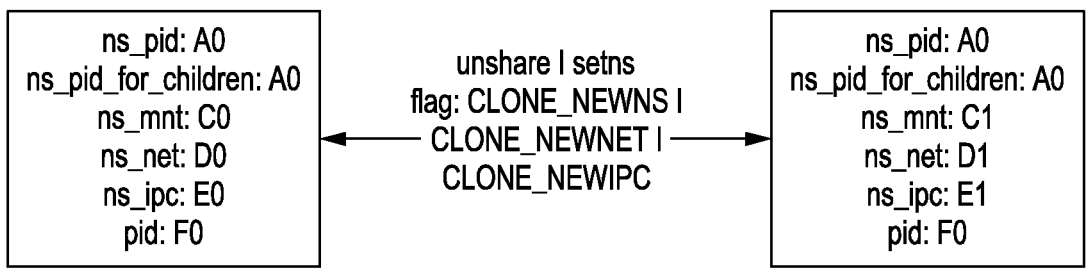
FIG. 7 depicts an Open Providence Model format handling of the unshare and setns system calls with other flags, in accordance with an embodiment of the present principles.

Embodiments consistent with the NAPTS 120 employ five different namespace labels (corresponding to PID, mount, network, IPC, and pid_for_children) and handle them when three namespace-related system calls (i.e., clone, unshare, and setns) occur, as shown in FIGS. 5, 6 and 7. All figures are illustrated in the OPM provenance data model format. Specifically, FIG. 5 depicts an OPM provenance data model format showing handling the clone system call: a process vertex representing the child will be created with the new namespace label. FIG. 6 depicts an OPM provenance data model format showing handling the unshare and setns system calls on NEWPID: a process vertex representing the calling process itself will be created with the new assigned pid_for_children label. Meanwhile, FIG. 7 depicts an OPM provenance data model format showing handling unshare and setns system calls with other flags: a process vertex representing the calling process itself will be created with the new assigned namespace label. The references 502, 602 and 702 highlight the changes between before and after. The implementation follows the Linux Kernel semantics for each system call and each namespace. The special case here is that if CLONE_NEWPID flag is specified for unshare or setns process, this only affects the child process generated by the calling process but does not affect the calling process itself. By adding namespace labels and handling namespace-related system calls, the NAPTS 120 is able to capture the namespace information for every single process and leverage the PID namespace label to certify the boundary of each container.

Initialization of Containers

By analyzing several state-of-the-art container engines, a specific common pattern is determined that exists across containers that may be leveraged to identify the initialization of containers. This pattern can be summarized as follows: start with an unshare/clone with new namespace flag specified, and end with an execve so that a new application can be launched inside the container. Slight differences exist across different container engines as described above. Identifying these patterns facilitates abstracting subgraphs in the provenance graph that corresponds to container spawning and initialization activity.

Here, the container initialization patterns for Docker and rkt are explained. For Docker, the initialization pattern is as follows:

After receiving gRPC connection from dockerd, containerd will start a containerd-shim, which is responsible for starting a new container.

This containerd-shim process will invoke several runC processes for initialization.

One of those runC processes will invoke the unshare system call and this marks the beginning of the actual container initialization.

The runC process calling unshare will clone several child processes to finish several initialization tasks including setting up /proc, /rootfs, and the network stack.

Finally, it will clone a child process and make it execute the default container application, e.g., bash and apache.

Unlike centralized container engines like Docker, rkt does not have a daemon process that is responsible for starting a container. It has a more complex three-stage initialization pattern that begins once rkt is started with specified parameters to create a rkt container.

Stage 0: It will use several instances of the systemd process to set up different namespaces including PID, Mount, Network, IPC and UTS.

Stage 1: It will generate process inside the container with namespace restriction set up and call chroot to create a filesystem jail for this container.

Stage 2: Finally, it will run the default application on this process.

In some embodiments, those patterns as a SPADE filter in the NAPTS 120, and it automatically finds the starting point of those initialization patterns and attempts to do a backward traversal so the subgraph corresponding to initialization will be marked.

Figure 8:
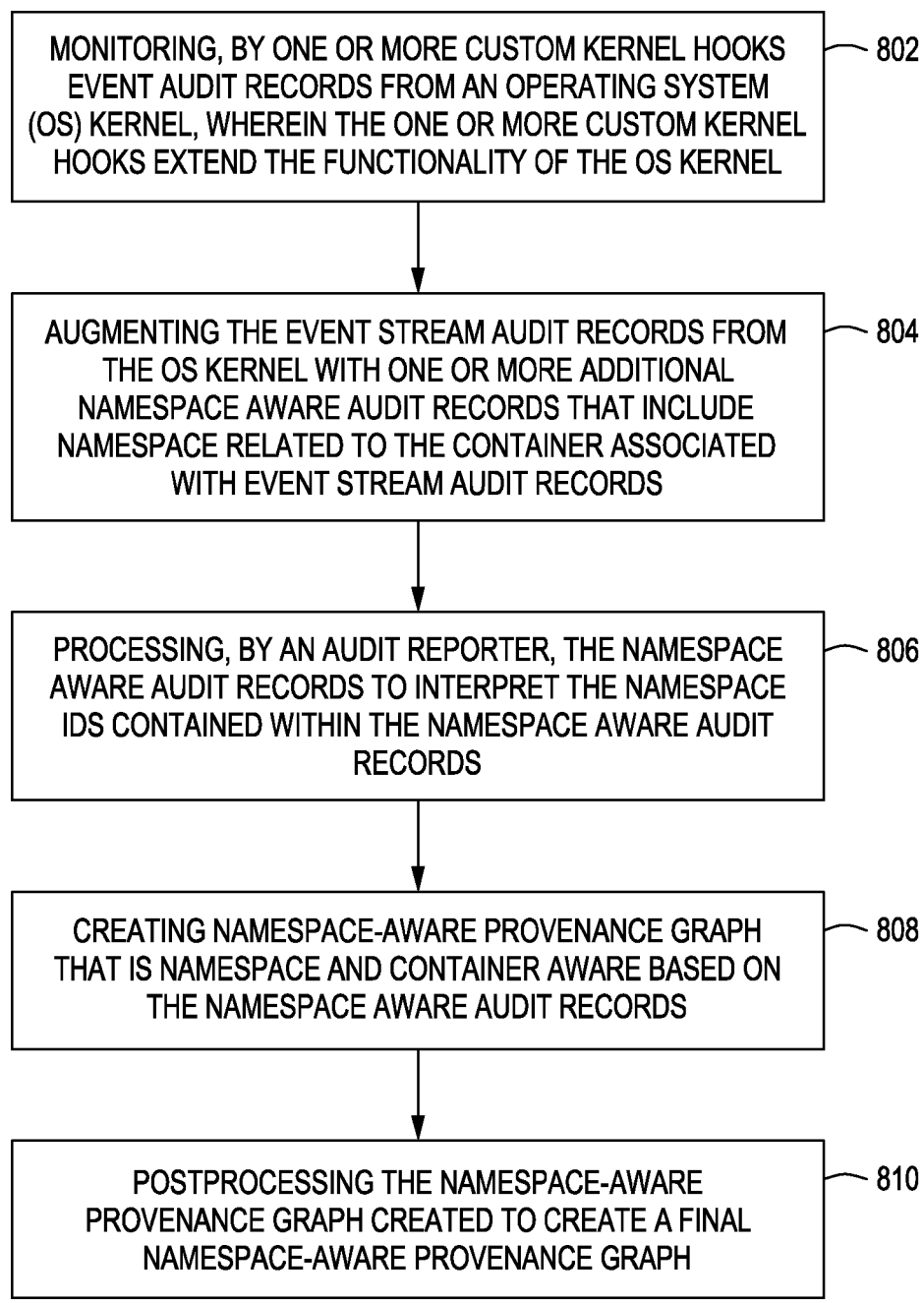
FIG. 8 depicts a flow diagram of method of providing namespace-aware provenance tracking and creation of namespace-aware provenance graphs, in accordance with an embodiment of the present principles.

FIG. 8 depicts a flow diagram of a method 800 for providing namespace-aware provenance tracking in a containerized environment. The method 800 begins at 802 where the NAPTS 120 monitors, by one or more custom kernel hooks 222 launched by a custom kernel 221, event audit records from an operating system (OS) kernel, wherein the one or more custom kernel hooks extend the functionality of the OS kernel. In some embodiments, the one or more custom kernel hooks can be dynamically launched/loaded and/or removed as necessary to monitor different system and network events to be audited.

The method 800 proceeds to 804, where the one or more custom kernel hooks 222*x* launched augments event stream audit records 219 from the OS kernel 142 with one or more additional namespace aware audit records 224 that include namespace and container information related to the container associated with event stream audit records 219, wherein the namespace and container information related to the container includes namespace IDs and container labels.

At 806, the audit reporter 226 receives and process the namespace aware audit records 224 to interpret the namespace IDs and container labels contained within the namespace aware audit records.

At 808, a namespace-aware provenance graph is created that is namespace and container aware based on the namespace aware audit records. The namespace-aware provenance graph includes vertices and edges with namespace IDs and container information associated with kernel system call events being monitored.

In some embodiments, at 810, the namespace-aware provenance graph may optionally undergo addition post-processing to create a final namespace-aware provenance graph 232. In some embodiments, the namespace-aware provenance graph created is used to detect security policy violations. In some embodiments, the namespace-aware provenance graph 232 may be sent to a Machine Learning system or CNN that handles security policy violations.

In some embodiments, the namespace-aware provenance graph can be stored in a database or other type of provenance storage that an analyst can query or it can be streamed to the analyst. It could be stored locally on the host system 102 or in the cloud. The namespace-aware provenance graph 232 may be stored in any representation that covers relationships between vertices and edges (e.g., put it in relationship tables, JSON, etc.), or other data structures.

Embodiments of a namespace-aware provenance tracking systems 120 and associated components, devices, and processes described can be implemented in a computing device 900 in accordance with the present principles. That is, in some embodiments, network packets, communications, data and the like can be communicated to and among containers and components of one or more host systems 102A, 102B including the namespace-aware provenance tracking systems 120, using the computing device 900 via, for example, any input/output means associated with the computing device 900. Data associated with a namespace-aware provenance tracking systems in accordance with the present principles can be presented to a user using an output device of the computing device 900, such as a display, a printer, or any other form of output device.

For example, FIGS. 1 and 2 depict high-level block diagrams of computing devices 102A and 102B suitable for use with embodiments of a namespace-aware provenance tracking systems in accordance with the present principles. In some embodiments, the computing device 900 can be configured to implement methods of the present principles as processor-executable executable program instructions 922 (e.g., program instructions executable by processor(s) 910) in various embodiments.

Figure 9:
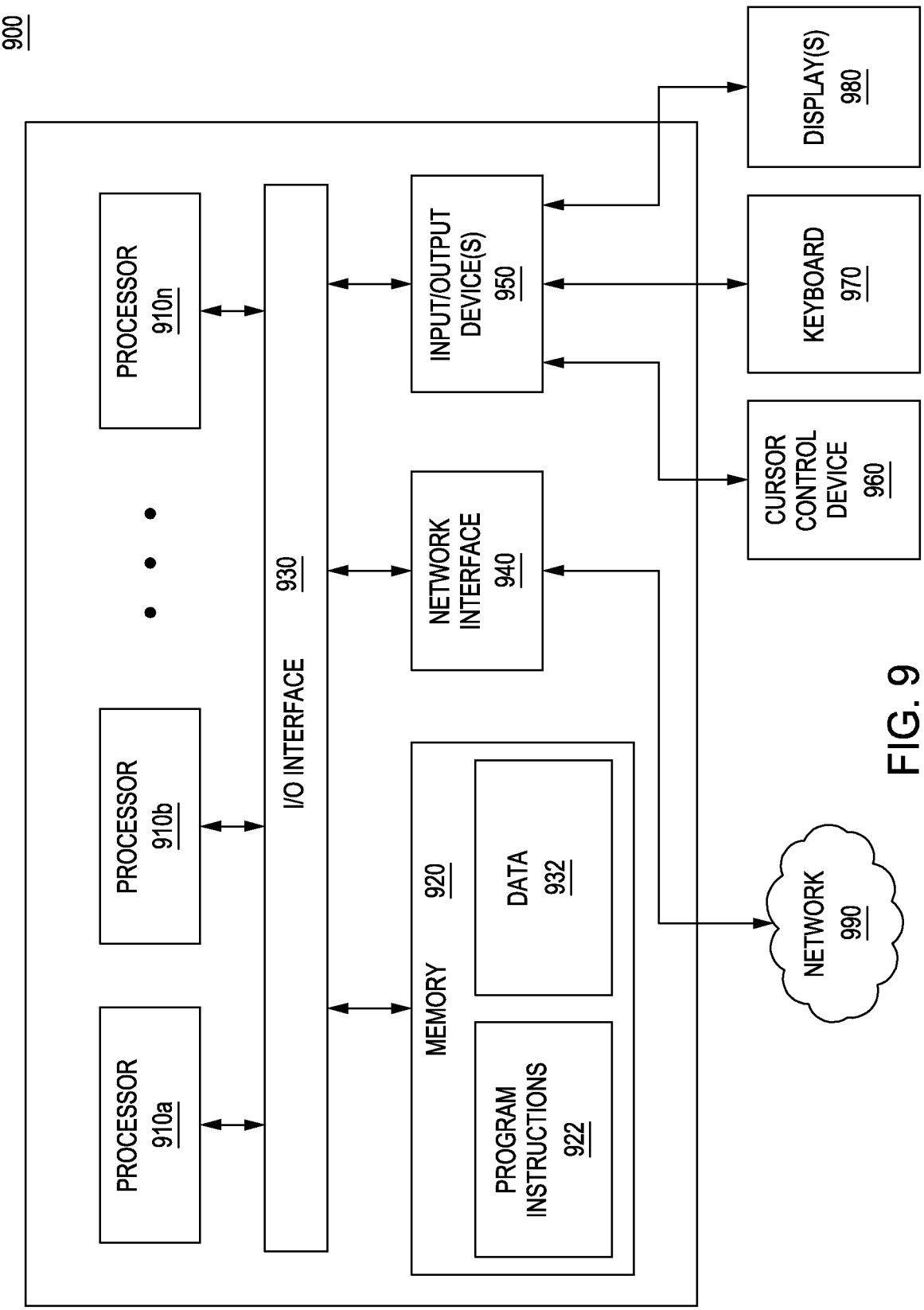
FIG. 9 depicts a high-level block diagram of a computing device suitable for use with embodiments of a namespace-aware provenance tracking systems in accordance with the present principles.

In embodiments consistent with FIG. 9, the computing device 900 includes one or more processors 910*a*-910*n* coupled to a system memory 920 via an input/output (I/O) interface 930. The computing device 900 further includes a network interface 940 coupled to I/O interface 930, and one or more input/output devices 950, such as cursor control device 960, keyboard 970, and display(s) 980. In various embodiments, a user interface can be generated and displayed on display 980. In some cases, it is contemplated that embodiments can be implemented using a single instance of computing device 900, while in other embodiments multiple such systems, or multiple nodes making up the computing device 900, can be configured to host different portions or instances of various embodiments. For example, in one embodiment some elements can be implemented via one or more nodes of the computing device 900 that are distinct from those nodes implementing other elements. In another example, multiple nodes may implement the computing device 900 in a distributed manner.

In different embodiments, the computing device 900 can be any of various types of devices, including, but not limited to, a personal computer system, desktop computer, laptop, notebook, tablet or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing or electronic device.

In various embodiments, the computing device 900 can be a uniprocessor system including one processor 910, or a multiprocessor system including several processors 910 (e.g., two, four, eight, or another suitable number). Processors 910 can be any suitable processor capable of executing instructions. For example, in various embodiments processors 910 may be general-purpose or embedded processors implementing any of a variety of instruction set architectures (ISAs). In multiprocessor systems, each of processors 910 may commonly, but not necessarily, implement the same ISA.

System memory 920 can be configured to store program instructions 922 and/or data 932 accessible by processor 910. In various embodiments, system memory 920 can be implemented using any suitable memory technology, such as static random-access memory (SRAM), synchronous dynamic RAM (SDRAM), nonvolatile/Flash-type memory, or any other type of memory. In the illustrated embodiment, program instructions and data implementing any of the elements of the embodiments described above can be stored within system memory 920. In other embodiments, program instructions and/or data can be received, sent or stored upon different types of computer-accessible media or on similar media separate from system memory 920 or computing device 900.

In one embodiment, I/O interface 930 can be configured to coordinate I/O traffic between processor 910, system memory 920, and any peripheral devices in the device, including network interface 940 or other peripheral interfaces, such as input/output devices 950. In some embodiments, I/O interface 930 can perform any necessary protocol, timing or other data transformations to convert data signals from one component (e.g., system memory 920) into a format suitable for use by another component (e.g., processor 910). In some embodiments, I/O interface 930 can include support for devices attached through various types of peripheral buses, such as a variant of the Peripheral Component Interconnect (PCI) bus standard or the Universal Serial Bus (USB) standard, for example. In some embodiments, the function of I/O interface 930 can be split into two or more separate components, such as a north bridge and a south bridge, for example. Also, in some embodiments some or all of the functionality of I/O interface 930, such as an interface to system memory 920, can be incorporated directly into processor 910.

Network interface 940 can be configured to allow data to be exchanged between the computing device 900 and other devices attached to a network (e.g., network 990), such as one or more external systems or between nodes of the computing device 900. In various embodiments, network 990 can include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 940 can support communication via wired or wireless general data networks, such as any suitable type of Ethernet network, for example; via digital fiber communications networks; via storage area networks such as Fiber Channel SANs, or via any other suitable type of network and/or protocol.

Input/output devices 950 can, in some embodiments, include one or more display terminals, keyboards, keypads, touchpads, scanning devices, voice or optical recognition devices, or any other devices suitable for entering or accessing data by one or more computer systems. Multiple input/output devices 950 can be present in computer system or can be distributed on various nodes of the computing device 900. In some embodiments, similar input/output devices can be separate from the computing device 900 and can interact with one or more nodes of the computing device 900 through a wired or wireless connection, such as over network interface 940.

Those skilled in the art will appreciate that the computing device 900 is merely illustrative and is not intended to limit the scope of embodiments. In particular, the computer system and devices can include any combination of hardware or software that can perform the indicated functions of various embodiments, including computers, network devices, Internet appliances, PDAs, wireless phones, pagers, and the like. The computing device 900 can also be connected to other devices that are not illustrated, or instead can operate as a stand-alone system. In addition, the functionality provided by the illustrated components can in some embodiments be combined in fewer components or distributed in additional components. Similarly, in some embodiments, the functionality of some of the illustrated components may not be provided and/or other additional functionality can be available.

The computing device 900 can communicate with other computing devices based on various computer communication protocols such a Wi-Fi, Bluetooth® (and/or other standards for exchanging data over short distances includes protocols using short-wavelength radio transmissions), USB, Ethernet, cellular, an ultrasonic local area communication protocol, etc. The computing device 900 can further include a web browser.

Although the computing device 900 is depicted as a general purpose computer, the computing device 900 is programmed to perform various specialized control functions and is configured to act as a specialized, specific computer in accordance with the present principles, and embodiments can be implemented in hardware, for example, as an application specified integrated circuit (ASIC). As such, the process steps described herein are intended to be broadly interpreted as being equivalently performed by software, hardware, or a combination thereof.

Figure 10:
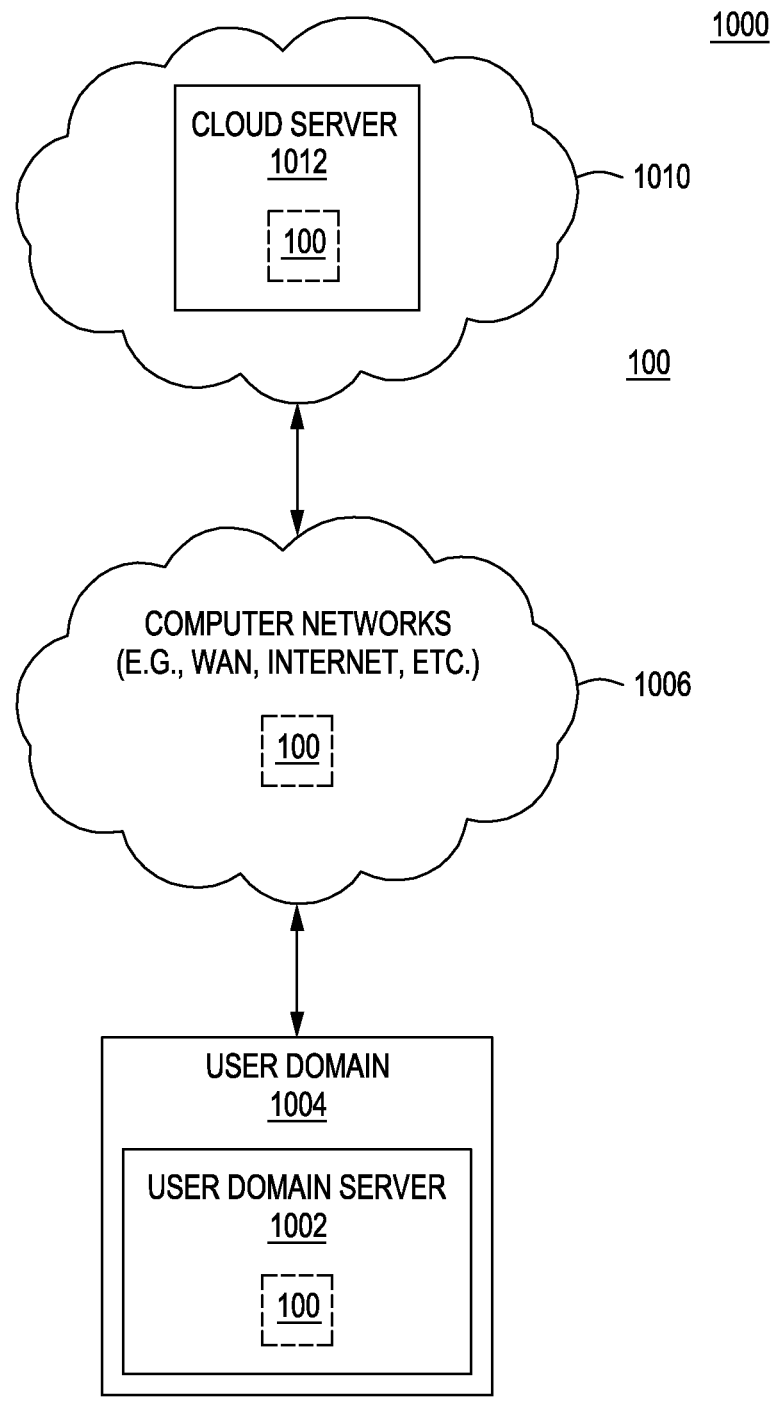
FIG. 10 depicts a high-level block diagram of a network in which embodiments of a container security system in accordance with the present principles, such as the namespace-aware provenance tracking system of FIG. 2, can be applied.

FIG. 10 depicts a high-level block diagram of a network in which embodiments of a namespace-aware provenance tracking systems in accordance with the present principles, such as the namespace-aware provenance tracking system 120 if FIGS. 1 and 2, can be applied. The network environment 1000 of FIG. 10 illustratively comprises a user domain 1002 including a user domain server/computing device 1004. The network environment 1000 of FIG. 10 further comprises computer networks 1006, and a cloud environment 1010 including a cloud server/computing device 1012.

In the network environment 1000 of FIG. 10, a system for namespace-aware provenance tracking in accordance with the present principles, such as the system 120 of FIGS. 1 and 2B, can be included in at least one of the user domain server/computing device 1004, the computer networks 1006, and the cloud server/computing device 1012. That is, in some embodiments, a user can use a local server/computing device (e.g., the user domain server/computing device 1004) to provide namespace-aware provenance tracking in accordance with the present principles.

In some embodiments, a user can implement a system for namespace-aware provenance tracking in the computer networks 1006 to provide namespace-aware provenance tracking in accordance with the present principles. Alternatively or in addition, in some embodiments, a user can implement a system for namespace-aware provenance tracking in the cloud server/computing device 1012 of the cloud environment 1010 to provide namespace-aware provenance tracking in accordance with the present principles. For example, in some embodiments it can be advantageous to perform processing functions of the present principles in the cloud environment 1010 to take advantage of the processing capabilities and storage capabilities of the cloud environment 1010.

In some embodiments in accordance with the present principles, a system for providing namespace-aware provenance tracking in a container network can be located in a single and/or multiple locations/servers/computers to perform all or portions of the herein described functionalities of a system in accordance with the present principles. For example, in some embodiments, containers 110 of a container network can be located in one or more than one of the user domain 1002, the computer network environment 1006, and the cloud environment 1010 and at least one global manager of the present principles, such as the NAPTS 120, can be located in at least one of the user domain 1002, the computer network environment 1006, and the cloud environment 1010 for providing the functions described above either locally or remotely.

In some embodiments, namespace-aware provenance tracking of the present principles can be provided as a service, for example via software. In such embodiments, the software of the present principles can reside in at least one of the user domain server/computing device 1004, the computer networks 1006, and the cloud server/computing device 1012. Even further, in some embodiments software for providing the embodiments of the present principles can be provided via a non-transitory computer readable medium that can be executed by a computing device at any of the computing devices at the user domain server/computing device 1004, the computer networks 1006, and the cloud server/computing device 1012.

Those skilled in the art will also appreciate that, while various items are illustrated as being stored in memory or on storage while being used, these items or portions of them can be transferred between memory and other storage devices for purposes of memory management and data integrity. Alternatively, in other embodiments some or all of the software components can execute in memory on another device and communicate with the illustrated computer system via inter-computer communication. Some or all of the system components or data structures can also be stored (e.g., as instructions or structured data) on a computer-accessible medium or a portable article to be read by an appropriate drive, various examples of which are described above. In some embodiments, instructions stored on a computer-accessible medium separate from the computing device 900 can be transmitted to the computing device 900 via transmission media or signals such as electrical, electromagnetic, or digital signals, conveyed via a communication medium such as a network and/or a wireless link. Various embodiments can further include receiving, sending or storing instructions and/or data implemented in accordance with the foregoing description upon a computer-accessible medium or via a communication medium. In general, a computer-accessible medium can include a storage medium or memory medium such as magnetic or optical media, e.g., disk or DVD/CD-ROM, volatile or non-volatile media such as RAM (e.g., SDRAM, DDR, RDRAM, SRAM, and the like), ROM, and the like.

The methods and processes described herein may be implemented in software, hardware, or a combination thereof, in different embodiments. In addition, the order of methods can be changed, and various elements can be added, reordered, combined, omitted or otherwise modified. All examples described herein are presented in a non-limiting manner. Various modifications and changes can be made as would be obvious to a person skilled in the art having benefit of this disclosure. Realizations in accordance with embodiments have been described in the context of particular embodiments. These embodiments are meant to be illustrative and not limiting. Many variations, modifications, additions, and improvements are possible. Accordingly, plural instances can be provided for components described herein as a single instance. Boundaries between various components, operations and data stores are somewhat arbitrary, and particular operations are illustrated in the context of specific illustrative configurations. Other allocations of functionality are envisioned and can fall within the scope of claims that follow. Structures and functionality presented as discrete components in the example configurations can be implemented as a combined structure or component. These and other variations, modifications, additions, and improvements can fall within the scope of embodiments as defined in the claims that follow.

In the foregoing description, numerous specific details, examples, and scenarios are set forth in order to provide a more thorough understanding of the present disclosure. It will be appreciated, however, that embodiments of the disclosure can be practiced without such specific details. Further, such examples and scenarios are provided for illustration, and are not intended to limit the disclosure in any way. Those of ordinary skill in the art, with the included descriptions, should be able to implement appropriate functionality without undue experimentation.

References in the specification to "an embodiment," etc., indicate that the embodiment described can include a particular feature, structure, or characteristic, but every embodiment may not necessarily include the particular feature, structure, or characteristic. Such phrases are not necessarily referring to the same embodiment. Further, when a particular feature, structure, or characteristic is described in connection with an embodiment, it is believed to be within the knowledge of one skilled in the art to affect such feature, structure, or characteristic in connection with other embodiments whether or not explicitly indicated.

Embodiments in accordance with the disclosure can be implemented in hardware, firmware, software, or any combination thereof. When provided as software, embodiments of the present principles can reside in at least one of a computing device, such as in a local user environment, a computing device in an Internet environment and a computing device in a cloud environment. Embodiments can also be implemented as instructions stored using one or more machine-readable media, which may be read and executed by one or more processors. A machine-readable medium can include any mechanism for storing or transmitting information in a form readable by a machine (e.g., a computing device or a "virtual machine" running on one or more computing devices). For example, a machine-readable medium can include any suitable form of volatile or non-volatile memory.

Modules, data structures, and the like defined herein are defined as such for ease of discussion and are not intended to imply that any specific implementation details are required. For example, any of the described modules and/or data structures can be combined or divided into sub-modules, sub-processes or other units of computer code or data as can be required by a particular design or implementation.

In the drawings, specific arrangements or orderings of schematic elements can be shown for ease of description. However, the specific ordering or arrangement of such elements is not meant to imply that a particular order or sequence of processing, or separation of processes, is required in all embodiments. In general, schematic elements used to represent instruction blocks or modules can be implemented using any suitable form of machine-readable instruction, and each such instruction can be implemented using any suitable programming language, library, application-programming interface (API), and/or other software development tools or frameworks. Similarly, schematic elements used to represent data or information can be implemented using any suitable electronic arrangement or data structure. Further, some connections, relationships or associations between elements can be simplified or not shown in the drawings so as not to obscure the disclosure.

This disclosure is to be considered as exemplary and not restrictive in character, and all changes and modifications that come within the guidelines of the disclosure are desired to be protected.

The invention claimed is:

1. A method for providing namespace-aware provenance tracking in a containerized environment, comprising:
monitoring, by one or more custom kernel hooks, event audit records from an operating system (OS) kernel in response to determining that specific required namespace related information was not captured in the event audit records;
augmenting, by the one or more custom kernel hooks, the event audit records from the OS kernel with one or more additional namespace aware audit records that include namespace information determined by the one or more custom kernel hooks and related to the a container in the containerized environment associated with the event audit records, wherein the namespace information related to the container includes namespace IDs;
processing, by an audit reporter, at least the additional namespace aware audit records to interpret the namespace IDs contained within the namespace aware audit records;
creating by the audit reporter, a namespace-aware provenance graph that is namespace and container aware based on the namespace aware audit records; and
handling, by a machine learning system, security policy violations using the namespace-aware provenance graph.

2. The method of claim 1, wherein the namespace-aware provenance graph includes vertices and edges with namespace IDs associated with event audit records being monitored.

3. The method of claim 1, further comprising:
extracting, by the one or more custom kernel hooks, network information associated with the event audit records from the OS kernel, wherein the network information includes identification of a host-container IP and port mapping, and a network namespace ID.

4. The method of claim 3, wherein the network information is extracted using network related hooks used by the one or more custom kernel hooks.

5. The method of claim 3, wherein the network information extracted is used to track host-container IP/port mapping and use the network namespace ID as a distinguisher within the namespace-aware provenance graph created.

6. The method of claim 1, further comprising:
postprocessing the namespace-aware provenance graph created to create a final namespace-aware provenance graph.

7. The method of claim 6, wherein the postprocessing of the namespace-aware provenance graph includes one or more of analyzing the namespace aware provenance graph to identify a boundary of all items in one container and group them together, identifying a subgraph that is related to initialization of a container associated with one or more items in the namespace-aware provenance graph.

8. The method of claim 1, wherein the OS kernel is a Linux kernel, and wherein Linux namespaces monitored include one or more of PID, User, Mount, Network, or IPC.

9. The method of claim 8, wherein PID namespace host-container mapping is performed as a custom kernel hook that intercepts process-manipulation-related system calls including clone, fork, and vfork.

10. The method of claim 8, wherein Mount namespace host-container mapping is performed as a custom kernel hook using root directory change system calls including pivot_root and chroot, and wherein new root directories are provided in arguments associated with a root directory change system call.

11. A namespace-aware provenance tracking system for monitoring event audit records and creating namespace and container aware provenance graphs in a containerized environment, comprising:
one or more custom kernel hooks configured to:
monitor event audit records from an operating system (OS) kernel in response to determining that specific required namespace related information was not captured in the event audit records, wherein the one or more custom kernel hooks extend functionality of the OS kernel in the containerized environment;
augment the event audit records from the OS kernel with one or more additional namespace aware audit records that include namespace information determined by the one or more custom kernel hooks and related to a container in the containerized environment associated with the event audit records, wherein the namespace information related to the container includes namespace IDs; and
an audit reporter configured to:
processing at least the additional namespace aware audit records to interpret the namespace IDs contained within the namespace aware audit records; and
create a namespace-aware provenance graph that is namespace and container aware based on the namespace aware audit records; and
handle, by a machine learning system, security policy violations using the namespace-aware provenance graph.

12. The namespace-aware provenance tracking system of claim 11, wherein the namespace-aware provenance graph includes vertices and edges with namespace IDs associated with event audit records being monitored.

13. The namespace-aware provenance tracking system of claim 11, wherein the one or more custom kernel hooks is further configured to extract network information associated with the event audit records from the OS kernel, wherein the network information includes identification of a host-container IP and port mapping, and a network namespace ID.

14. The namespace-aware provenance tracking system of claim 13, wherein the network information extracted is used to track host-container IP/port mapping and use the network namespace ID as a distinguisher within the namespace-aware provenance graph created.

15. The namespace-aware provenance tracking system of claim 11, further comprising:
a provenance graph post processing module configured to postprocess the namespace-aware provenance graph created to create a final namespace-aware provenance graph.

16. The namespace-aware provenance tracking system of claim 15, wherein the postprocessing of the namespace-aware provenance graph includes one or more of analyzing the namespace aware provenance graph to identify a boundary of all items in one container and group them together, identifying a subgraph that is related to initialization of a container associated with one or more items in the namespace-aware provenance graph.

17. The namespace-aware provenance tracking system of claim 11, wherein the OS kernel is a Linux kernel, and wherein the Linux namespaces monitored include one or more of PID, User, Mount, Network, or IPC.

18. The namespace-aware provenance tracking system of claim 17, wherein PID namespace host-container mapping is performed as a custom kernel hook that intercepts process-manipulation-related system calls including clone, fork, and vfork.

19. The namespace-aware provenance tracking system of claim 17, wherein Mount namespace host-container mapping is performed as a custom kernel hook using root directory change system calls including pivot_root and chroot, and wherein new root directories are provided in arguments associated with a root directory change system call.

20. One or more non-transitory computer readable media having instructions stored thereon which, when executed by one or more processors, cause the one or more processors to perform operations comprising:

monitoring, by one or more custom kernel hooks, event audit records from an operating system (OS) kernel in response to determining that specific required namespace related information was not captured in the event audit records, wherein the one or more custom kernel hooks extend functionality of the OS kernel in the containerized environment;

augmenting, by the one or more custom kernel hooks, the event audit records from the OS kernel with one or more additional namespace aware audit records that include namespace information determined by the one or more custom kernel hooks and related to a container in the containerized environment associated with the event audit records, wherein the namespace information related to the container includes namespace IDs;

processing, by an audit reporter, at least the additional namespace aware audit records to interpret the namespace IDs contained within the namespace aware audit records; and creating by the audit reporter, a namespace-aware provenance graph that is namespace and container aware based on the namespace aware audit records; and handling, by a machine learning system, security policy violations using the namespace-aware provenance graph.

\* \* \* \* \*